Patented July 7, 1953

2,644,836

UNITED STATES PATENT OFFICE 2,644,836

1,1-DISUBSTITUTION PRODUCTS OF 2-TETRALONES

Milton D. Soffer, Northampton, Mass., assignor to Research Corporation, New York, N. Y., a corporation of New York No Drawing. Application April 27, 1950, Serial No. 158,587

1 Claim. (Cl. 260—473)

This invention relates to new compounds comprising 1,1-disubstitution products of 2-tetralone and its 7 and 7,8 lower alkoxy derivatives and to methods of making them.

The compounds of the invention provide useful intermediates for the preparation of physiologically active substances having a structural relationship to morphine. They may be represented by the general formula

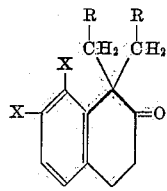

wherein the R's represent hydrogen, CN, COOH, COO·Alk, CH₂COOH or CH₂COO·Alk, Alk representing a lower alkyl group and the X's represent hydrogen or lower alkoxy groups.

The free glutaric acid derivatives, wherein the R's are COOH, readily form dilactones of the general formula

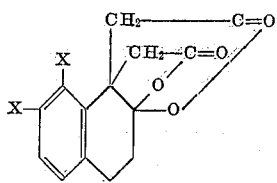

which are also within the scope of the invention.

The compounds of the invention may be made by the dialkylation of 2-tetralones of the formula

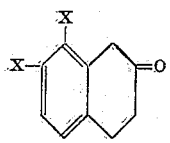

The principles of the invention are illustrated by the following typical examples:

EXAMPLE I

*1,1-di(carbomethoxymethyl)-2-tetralone*

In a flame-dried, three-necked flask fitted with a mercury seal stirrer, a condenser, and a thermometer for measuring internal liquid temperature, is placed 150 ml. of anhydrous C. P. benzene, 45.13 g. of freshly distilled 2-tetralone, and 141.8 g. of methyl bromoacetate. An Erlenmeyer flask, containing 17.8 g. of sodium hydride, is attached to one neck of the reaction vessel by means of a short piece of rubber tubing. A three-way stopcock attached to the top of the condenser serves as a nitrogen inlet and later as a hydrogen outlet. One arm of the stopcock is attached through a drying tube to either a mechanical gas meter or an apparatus for measuring volume by benzene displacement. The flask is immersed in an ice bath and air is thoroughly swept from the system with dry nitrogen. The addition of a small amount of sodium hydride causes an immediate exothermic reaction. The sodium hydride is added over a period of one and one-half hours at such a rate that the temperature is not caused to exceed 20° C. During this time the reaction mixture becomes cloudy and takes on an orange color which changes to purple and finally to gray. The flask is kept in the ice bath four hours longer, at which point no more hydrogen is evolved. The mixture is refluxed for two and one-third hours causing a small additional evolution of the gas, making the total amount correspond to complete reaction.

Fifty milliliters of glacial acetic acid is added, followed by several drops of concentrated hydrochloric acid and 100 ml. of water. The mixture is extracted with large volumes of ether and the combined extracts are washed thoroughly with sodium bicarbonate solution, and with water, and dried. Removal of the solvent and excess methyl bromoacetate at reduced pressure gives the crude crystalline product a 98% yield. Recrystallization from ether-petroleum ether gives colorless well defined needles, M. P. 87.5–88° C.; B. P. 159° C. at 0.65 mm.

The compound may also be made by using potassium tert.-butoxide (from 7.8 g. of potassium and 180 ml. of anhydrous tert.-butyl alcohol) instead of sodium hydride, with 7.3 g. of 2-tetralone and 38.25 g. of the bromoester.

EXAMPLE II

*1,1-di(cyanomethyl)-2-tetralone*

The apparatus and technique are similar to that described in Example I. Twenty-four grams of sodium hydride is added in small portions, over a period of five hours, to a solution of 48 g. of 2-tetralone and 74.3 g. of chloracetonitrile in 150 ml. of anhydrous ether, cooled in an ice bath. After one more hour at 0° C., and the addition of 250 ml. of anhydrous ether, the solution is allowed to come to room temperature. The stirring is continued overnight.

Sixty milliliters of glacial acetic acid is added with vigorous stirring, followed cautiously with 70 ml. of water and 70 ml. of concentrated hydrochloric acid. The crystalline precipitate is filtered and washed with water and ether, until the washings are colorless. The vacuum-dried product is relatively pure, M. P. 135–136° C.; yield, 65.5 g.

EXAMPLE III

*1,1-di(β-carbomethoxyethyl)-2-tetralone*

This preparation is carried out as described for the previous diester, using 10.00 g. of 2-tetralone, 57.20 g. of methyl β-bromopropionate, 50 ml. of anhydrous benzene, and 6.58 g. of sodium hydride. As in the previous examples, the addition of the hydride produces an immediate exothermic reaction, but the temperature is maintained for the most part at 10–20° C. Benzene is added as needed to facilitate stirring. After treatment with acid and ether, and washing with aqueous sodium bicarbonate as usual, the solvent and excess methyl β-bromopropionate are removed from the neutral extract at reduced pressure.

Ice and 2% aqueous sodium hydroxide are added to an ethereal solution of the product in a separatory funnel, and a stream of compressed air is bubbled through the mixture to complete the oxidation of the residual 2-tetralone, and to provide the necessary agitation. The aqueous layer is drawn off and replaced with fresh alkaline solution, and the process is repeated until that treatment failed to produce the characteristic blue color with alcoholic sodium hydroxide. The washed and dried ether extract gives 15.80 g. (72.5%) of crude keto diester as a viscous, yellow residual oil.

For further purification the diester is converted to the acid by refluxing with aqueous potassium hydroxide in the usual way. The crude product is obtained by precipitation from the washed solution and, further, by extraction of the aqueous acid filtrates. The total yield of crystalline material melting over 173° C. is 13.71 g. (96%). Recrystallization from water, and from methanol-benzene, gives pure 1,1-di(β-carboxyethyl)-2-tetralone, M. P. 182–183° C. The substance is soluble in methanol, 95% ethanol, and in hot water; insoluble in benzene.

Four grams (0.0138 mole) of the pure keto diacid is converted to the ester by refluxing for six hours with 100 ml. of absolute methanol and 3 ml. of concentrated sulfuric acid. Methanol is removed at reduced pressure and the neutral product isolated in the usual way. The entire residual oil is obtained as a viscous water-white distillate, B. P. 187° C. at 0.28 mm.; 4.30 g. (98%).

EXAMPLE IV

*1,1-dimethyl-2-tetralone*

The reaction is carried out as described in the preceding examples, using 8.21 g. of 2-tetralone, 8.7 ml. of methyl iodide, 40 ml. of anhydrous benzene and 4.3 g. of sodium hydride. The reaction is immediate and exothermic, and the addition of the sodium hydride is spread out over forty-five minutes while the temperature is kept below 25° C. Stirring is continued for one and one-half hours at room temperature and for one hour at reflux temperature. The hydrogen evolution is approximately stoichiometric for dialkylation.

The mixture is treated with acid and worked up for the neutral fraction in the usual manner. The product distills as a colorless oil, B. P. 73–77° C. at 0.1 mm. (7.8 g., 80%), and gives a negative tetralone-blue test. For further purification the liquid is stirred overnight with 50 ml. of saturated aqueous sodium bisulfite, and washed and dried as usual, B. P. 92–96° C. at 0.5 mm., $d_4^{22.5}$ 1.045, $n_D^{20}$ 1.538.

EXAMPLE V

*1,1-di(carboxymethyl)-2-tetralone hydrate dilactone*

Ninety-nine grams of the keto diester of Example I is saponified by refluxing for two and one-half hours with 15% aqueous potassium hydroxide. The alkaline solution is washed with benzene and ether, and acidified with concentrated hydrochloric acid. The turbid solution is extracted with ether and the extracts are washed with water and dried over anhydrous magnesium sulfate. Removal of solvent at reduced pressure gives 83 g. (100%) of crude crystalline material, which melts at 140–140.5° C. after recrystallization from 95% ethanol.

The same product is obtained from the keto dinitrile of Example II (1.06 g.), by refluxing for twelve hours with concentrated hydrochloric acid, adding fresh portions of acid periodically. The crystalline alkali-soluble material (0.54 g.: 47%) is isolated by the usual extraction procedure and recrystallized from ethanol.

The crystals are insoluble in aqueous sodium bicarbonate. They dissolve immediately in hot dilute sodium hydroxide, and are only slowly soluble in the cold.

When an alkaline solution of the dilactone is mixed with excess dilute acid and quickly extracted with ether, nearly all of the original dilactone is subsequently recovered by immediate sodium bicarbonate extraction followed by acidification and re-extraction with ether. When, on the other hand, the dilactone itself is dissolved in ether and washed well with bicarbonate, an almost quantitative recovery of the starting material is made from the washed ether solution. It is apparent that the diacid is actually formed under these conditions and is capable of at least transient existence in aqueous and ethereal media.

EXAMPLE VI

*1,1-di(carboxymethyl)-1,2,3,4-tetrahydronaphthalene*

A solution of 33.0 g. of the anhydro compound of Example V and 84 g. of potassium hydroxide in 700 ml. of diethylene glycol is treated with 70 ml. of hydrazine hydrate at about 200° C. Water is added and the clear solution is saturated with carbon dioxide, causing the precipitation of a large amount of unidentified nitrogenous product. The filtered bicarbonate solution, washed with chloroform and worked up for the acid fraction, gives 1.52 g. (4.5%) of the crystalline dicarboxylic acid. Treatment with Norite and recrystallization from benzene-petroleum ether (B. P. 90–100° C.), and from water, gives beautiful long needles, M. P. 162–162.5° C.

1,1-di(carboxymethyl)-1,2,3,4-tetrahydronaphthalene anhydride is prepared by refluxing 200 mg. of the diacid with 5 ml. of acetyl chloride for three hours. Volatile material is removed at reduced pressure, and the residue, which sublimes readily, is recrystallized from hexane or petroleum ether, (B. P. 90–100° C.), as delicate, pure white needles, M. P. 121–122° C.

I claim:

Compounds of the formula

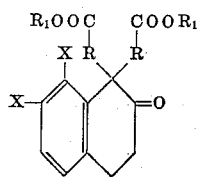

wherein R is an alkylene group of from 1 to 2 carbon atoms, $R_1$ is selected from the group consisting of hydrogen and lower alkyl groups and X is selected from the group consisting of hydrogen and lower alkoxy groups.

MILTON D. SOFFER.

References Cited in the file of this patent

Lucas, Compte Rendue, 201, pp. 1387–1390, 1937.